9264X
G. Richards,
Fire Place.
No. 9,264 X
Patented Nov. 26, 1835.
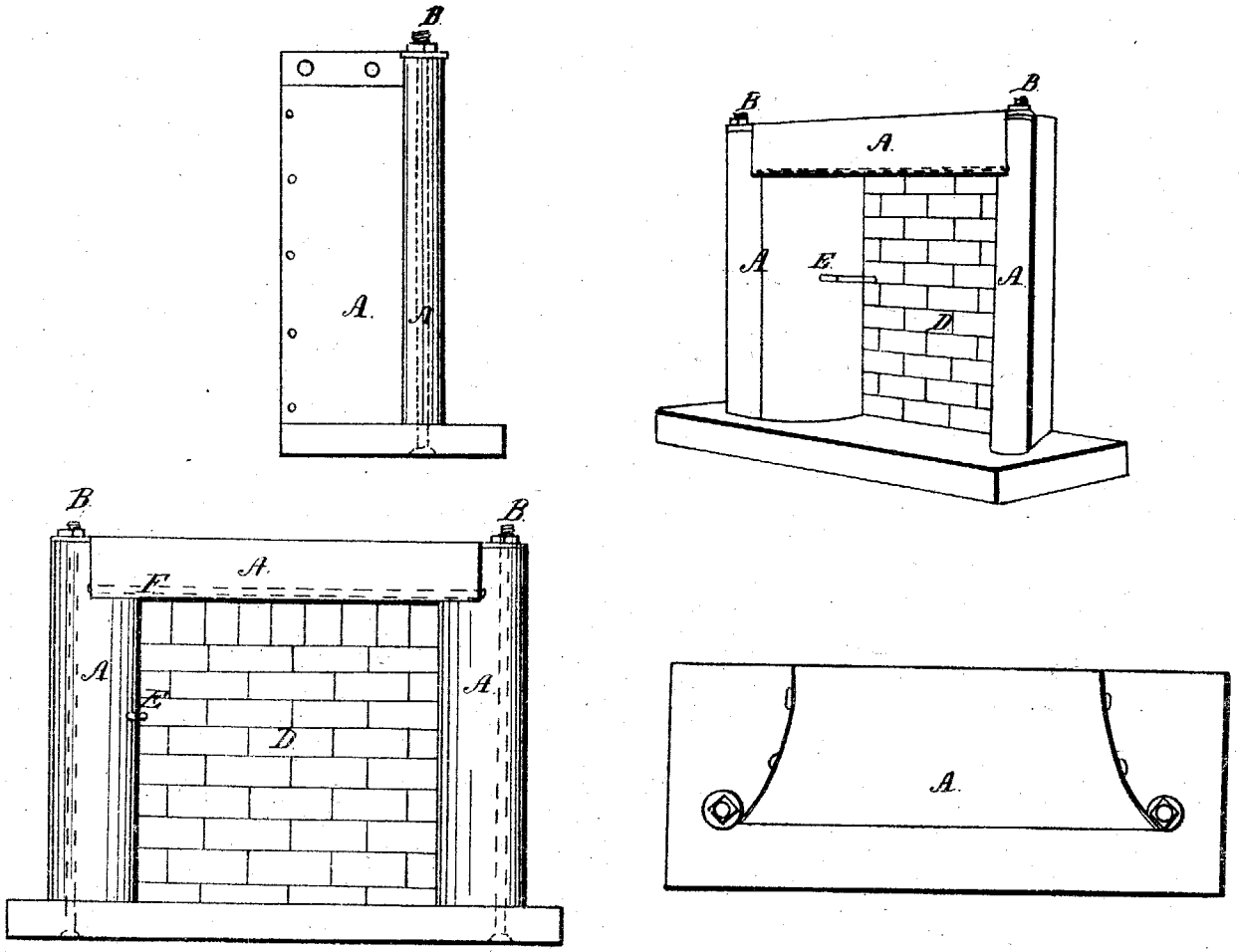

9264X Nov 26. 1835

Gilbert Richards. Ashfield Massachusetts

Letters Patent.

The Schedule referred to in these Letters Patent and making part of the same containing a description in the words of the said Gilbert Richards himself of his improvement in the sheet iron fire place or frame To all to whom these presents shall come. Be it known that I Gilbert Richards of Ashfield in the County of Franklin and State of Massa= chusetts have invented a new and useful article called a Fire frame made of Sheet iron. and that the following is a full and exact descrip= tion of the construction and use of the said frame as invented or improved by me to wit. 1st Take a plain piece of Sheet iron of about two feet wide. either a little more or a little less and of any height suitable for the fire place in which the frame is designed to be placed then on the front edge of this piece of the Sheet Iron with a proper in= strument or machine make a roll or cylinder, this makes the main part of one side of the said frame. the other side is like = made the same way. only the cylinder turns a contrary way. These sides may be either straight or swelled. Then construct a cap for the sides of the frame. the right and left hand edge turned down in width about one and a half inch for the purpose of holding together the sides of the frame The front edge of the cap is to be about one foot wi= der than the back and bent over in front about six inches to form a Mantel the lower edge of the Mantel having a small wire roll= ed in and the ends of the wire inserted into the cylinders. Then make two straps of sheet iron or other metal of about one inch and a half wide. placed near the top of the frame fastened in with bolts or nuts & screws passing through the right & left hand edges of the cap turned down and the upper part of the sides of the frame for the purpose of giving the frame strength & holding it together. Over the upper ends of the cylinders put caps with holes in the centres for iron Rods to pass down through the cylinders The lower ends of the iron rods are to be fastened into holes drilled 266. 9264X into the hearth of the fire place by lead or otherwise The rods must have also screws & nuts on the upper ends which can be screwed down so as to make the frame firm The Crane eyes for the frame can be laid upon put into the new back [illegible] ed in the fire place. or crane eyes may be used, described as follows: to wit: The upper eye may be fastened to the old eye by a hook and extended out sufficiently so that it may be turned in through the sides of the frame. The lower eye hooked as the upper and extended in front sufficiently to admit the crane. All I claim as a patent is the making of the frame fast [illegible] in ... manner described.

Recd. Witness

W.[illegible] Almon Brainard Gilbert Richards

Nelson Gardner (Patented November 26. 1835) ([illegible] words)

(Drawing)